(12) United States Patent
Oohashi (10) Patent No.: US 10,809,700 B2
(45) Date of Patent: Oct. 20, 2020

(54) NUMERICAL CONTROLLER

(71) Applicant: FANUC CORPORATION, Minamitsuru-gun, Yamanashi (JP)

(72) Inventor: Takumi Oohashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 25 days.

(21) Appl. No.: 16/165,443

(22) Filed: Oct. 19, 2018

(65) Prior Publication Data

US 2019/0121325 A1    Apr. 25, 2019

(30) Foreign Application Priority Data

Oct. 24, 2017  (JP) .................. 2017-205333

(51) Int. Cl.
  *G05B 19/4155*  (2006.01)
  *B23Q 3/155*  (2006.01)
  *G05B 19/4065*  (2006.01)

(52) U.S. Cl.
  CPC ......... *G05B 19/4155* (2013.01); *B23Q 3/155* (2013.01); *B23Q 3/15503* (2016.11); *G05B 2219/33124* (2013.01)

(58) Field of Classification Search
  CPC ...... G05B 19/4155; G05B 2219/33124; G05B 2219/36362; G05B 2219/36364; G05B 2219/36359; G05B 2219/36219; G05B 2219/50263; G05B 2219/50253; G05B 2219/50257; G05B 19/40938; G05B 19/182; B23Q 3/155; B23Q 3/15503
  See application file for complete search history.

(56) References Cited

U.S. PATENT DOCUMENTS

| | | | | | |
|---|---|---|---|---|---|
| 4,497,029 | A | * | 1/1985 | Kiyokawa | G05B 19/182 318/563 |
| 4,543,636 | A | * | 9/1985 | Noda | B23Q 3/15539 700/179 |
| 4,608,645 | A | * | 8/1986 | Niwa | G05B 19/404 318/572 |
| 4,972,322 | A | * | 11/1990 | Asakura | G05B 19/40938 318/568.1 |
| 2003/0163208 | A1 | * | 8/2003 | Sugiyama | G05B 19/40938 700/28 |

(Continued)

FOREIGN PATENT DOCUMENTS

| JP | S60-228049 A | 11/1985 |
|---|---|---|
| JP | 06000738 A | 1/1994 |

(Continued)

OTHER PUBLICATIONS

Japanese Notice of Reasons for Refusal for Japanese Application No. 2017-205333, dated Dec. 3, 2019, with translation, 6 pages.

*Primary Examiner* — Rocio Del Mar Perez-Velez
*Assistant Examiner* — Brian T McMenemy
(74) *Attorney, Agent, or Firm* — RatnerPrestia (57) ABSTRACT

A numerical controller performs control for changing a tool mounted on a spindle to another tool stored in a tool magazine based on a machining program. The numerical controller analyzes a command by a block of the machining program, predicts a time required for machining by the analyzed command, and selects a tool changeable before a tool change command, during tool selection, based on the predicted time.

5 Claims, 8 Drawing Sheets

(56) References Cited

U.S. PATENT DOCUMENTS

| | | | |
|---|---|---|---|
| 2005/0228533 A1* | 10/2005 | Hioki | G05B 19/4103 |
| | | | 700/159 |
| 2009/0036282 A1* | 2/2009 | Yasuda | B23Q 3/15766 |
| | | | 483/56 |
| 2012/0109359 A1 | 5/2012 | Mizuno et al. | |
| 2015/0134105 A1* | 5/2015 | Iuchi | G05B 19/19 |
| | | | 700/186 |
| 2015/0268659 A1* | 9/2015 | Nishi | G05B 15/02 |
| | | | 700/114 |
| 2017/0129064 A1 | 5/2017 | Uenishi | |

FOREIGN PATENT DOCUMENTS

| | | |
|---|---|---|
| JP | 2000084778 A | 3/2000 |
| JP | 2005193312 A | 7/2005 |
| JP | 2005-301440 A | 10/2005 |
| JP | 2007-025945 A | 2/2007 |
| JP | 2010033150 A | 2/2010 |
| JP | 2010234449 A | 10/2010 |
| JP | 2012-093975 A | 5/2012 |
| JP | 2012187668 A | 10/2012 |
| JP | 2017087333 A | 5/2017 |

\* cited by examiner

SELECTION OF T1 (No.1->No.8)

RETURN OF T4 (No.8->No.6)

SELECTION OF T2 (No.6->No.5)

RETURN OF T1 (No.5->No.8)

SELECTION OF T3 (No.8->No.3)

NUMERICAL CONTROLLER

CROSS-REFERENCE TO RELATED APPLICATION

This application is a new U.S. Patent Application that claims benefit of Japanese Patent Application No. 2017-205333, filed Oct. 24, 2017, the disclosure of this application is being incorporated herein by reference in its entirety for all purposes.

BACKGROUND OF THE INVENTION

1. Field of the Invention

The invention relates to a numerical controller, and particularly relate to a numerical controller that performs tool change in consideration of a tool change time.

2. Description of the Related Art

Figure 8:
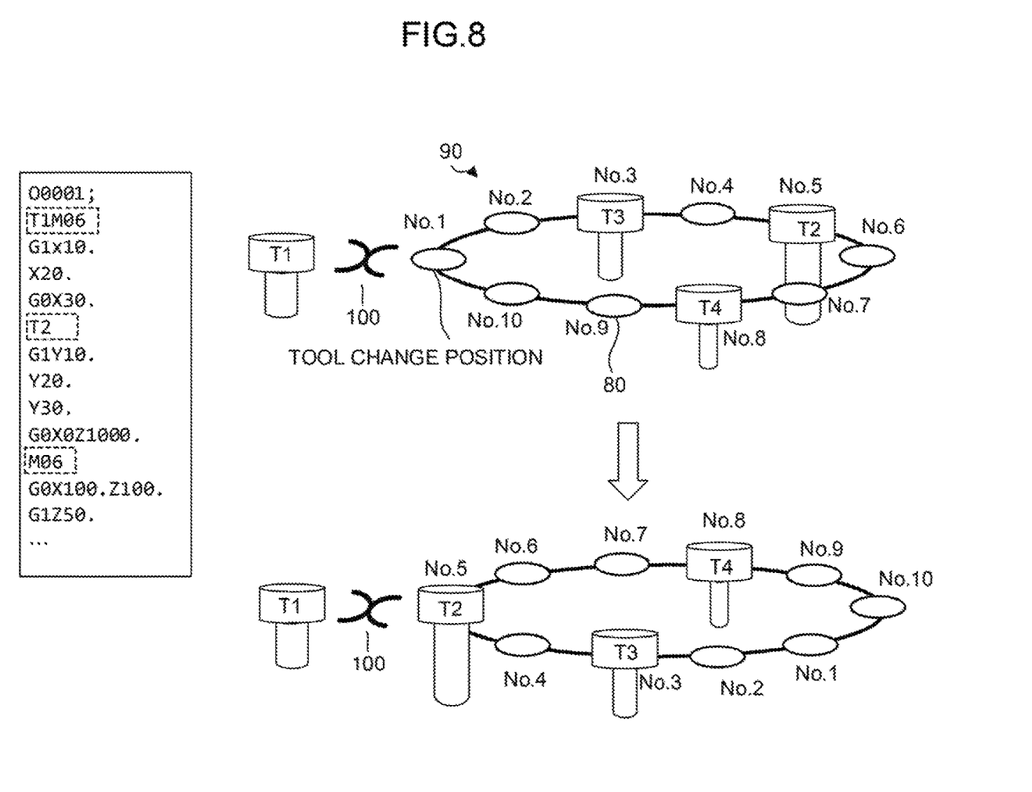
FIG. 8 is a diagram illustrating an example of tool change by a tool change device of a conventional technology.

A machining center used as a machine tool generally includes a tool change device for automatically changing a tool mounted on a spindle. For example, as illustrated in FIG. 8, a tool change device having a turning type tool magazine corresponding to the tool change device includes a plurality of tool gripping portions (tool pots) on a circumferential surface of the tool magazine, and can hold a tool in each of the tool gripping portions, turn the tool magazine to position a tool to be changed to a tool change position, attach the tool to a spindle of a machining center, and detach the tool. In FIG. 8, each tool pot 80 is assigned with a pot number and managed. In an upper view of FIG. 8, a tool pot of pot No. 1 is indexed at a tool change position, and pot numbers of pots No. 2 to No. 10 are assigned clockwise therefrom.

In the machining center including such a tool change device, changing of the tool attached to the spindle is performed by a tool selection command (T code) and a tool change command (M06) included in a machining program. In an example illustrated in FIG. 8, in response to start of a program, a tool T1 is mounted on a spindle by a command "T1M06", and machining is performed. Thereafter, a tool magazine 90 is positioned so that a tool T2 held in a tool pot at a tool change position comes to a tool change position by a command "T2", and the tool T1 mounted on the spindle and the tool T2 at the tool change position are replaced using an auto tool changer (ATC) 100 by a command "M06". In this instance, during a period from an execution time of the command "T2" until the tool magazine 90 rotates and the tool T2 is positioned at the tool change position, there is a time lag (a time from when the tool magazine 90 starts to rotate and the tool T2 moves to the tool change position until the tool magazine 90 stops). Thus, in the machining program illustrated in FIG. 8, several machining commands are included between the command "T2" and the command "M06" so as not to waste the time (to shorten a cycle time).

As described above, when a tool selection command and a tool change command are included in a machining program, it is desirable to perform a reverse operation of a time required for tool selection (a time required for rotation of the tool magazine 90, etc.) to issue the tool selection command at a block prior to a block in which the tool starts to be used. As a conventional technology applying such a tool change scheme, for example, Japanese Patent Application Laid-Open No. 60-228049 proposes a tool change scheme in which at the same time as selecting a tool to be used according to a tool selection command, a tool to be subsequently used is commanded by a further command (E code) to move the tool to a tool change position as soon as possible, thereby minimizing a waiting time of operation.

When a time required for tool selection by a tool selection command is longer than an execution time of a machining command between the tool selection command and a tool change command, execution of a machining program is eventually kept waiting until tool selection is completed by the tool change command. To avoid this situation, it is necessary to sufficiently examine a position of the tool selection command so as not to cause a waiting time before execution of the machining program, or examine a position of the tool in the tool magazine. However, such work is a heavy burden on an operator. In addition, even though the technology disclosed in Japanese Patent Application Laid-Open No. 60-228049 described above has an effect of increasing efficiency of a tool change operation in machining to some extent, for example, optimum tool selection is not ensured when a plurality of tools of the same type is registered in the magazine.

SUMMARY OF THE INVENTION

In this regard, an object of the embodiments is to provide a numerical controller that performs tool change efficiently by a tool change device without examining a position of a tool selection command in a machining program.

In the present invention, the above-mentioned problem is solved by providing the numerical controller with means for selecting a tool which can be changed before a tool change command during tool selection by a tool selection command. In a case in which a plurality of tools of the same type are present in a tool magazine, the numerical controller of the embodiments has a function of selecting a tool from tools which can be changed in time before the tool change command.

In addition, the numerical controller of the present invention has means for verifying whether waiting occurs in the tool change command in advance at a start of a machining operation by the machining program. Further, when a tool selection command in which waiting occurs in the tool change command is included in the machining program, a candidate for a command position of a tool selection command in which waiting does not occur in the tool change command is presented to an operator. Meanwhile, when a command position of a tool selection command in which waiting does not occur in the tool change command is not found (when waiting occurs in the tool change command irrespective of a position to which the tool selection command is moved), a candidate for a position of a tool on a tool magazine in which waiting does not occur in the tool change command is presented.

A numerical controller according to the embodiments performs control for changing a first tool mounted on a spindle to a second tool stored in a tool magazine based on a machining program, and includes a command analysis unit for analyzing a command by a block of the machining program, a machining time prediction unit for predicting a time required for machining by the command analyzed by the command analysis unit, and a tool selection unit for selecting a tool that can be changed before a tool change command during tool selection, as the second tool, based on the time required for machining by the command predicted by the machining time prediction unit.

The numerical controller may further include a tool pot movement time storage unit for storing in advance a time required to move a tool pot at a tool change position of the tool magazine to a predetermined tool pot. Further, when a tool selection command is issued during a machining operation by the machining program, the tool selection unit may select a tool allowed to be selected within a machining time from the tool selection command to a subsequent tool change command, predicted by the machining time prediction unit, by referring to the tool pot movement time storage unit. Further, when a plurality of tools is allowed to be selected within the machining time from the tool selection command to the tool change command, the tool selection unit may select a tool to be changed according to a predetermined order of priority determined in advance.

The tool selection unit may perform tool selection by the tool selection command such that tool selection by another tool selection command commanded after the tool selection command is allowed before a tool change command subsequent to the other tool selection command.

The numerical controller may further include a tool related command analysis unit for determining whether tool selection by the tool selection command by the block of the machining program ends before execution of a tool change command subsequent to the tool selection command at a start of a program operation.

According to the present invention, even when the operator does not carefully examine a position of a tool selection command in a machining program, tools which can be selected before a tool change command can automatically be selected. Thus, it is possible to efficiently perform tool change by a tool change device.

DETAILED DESCRIPTION OF THE PREFERRED EMBODIMENTS

Figure 1:
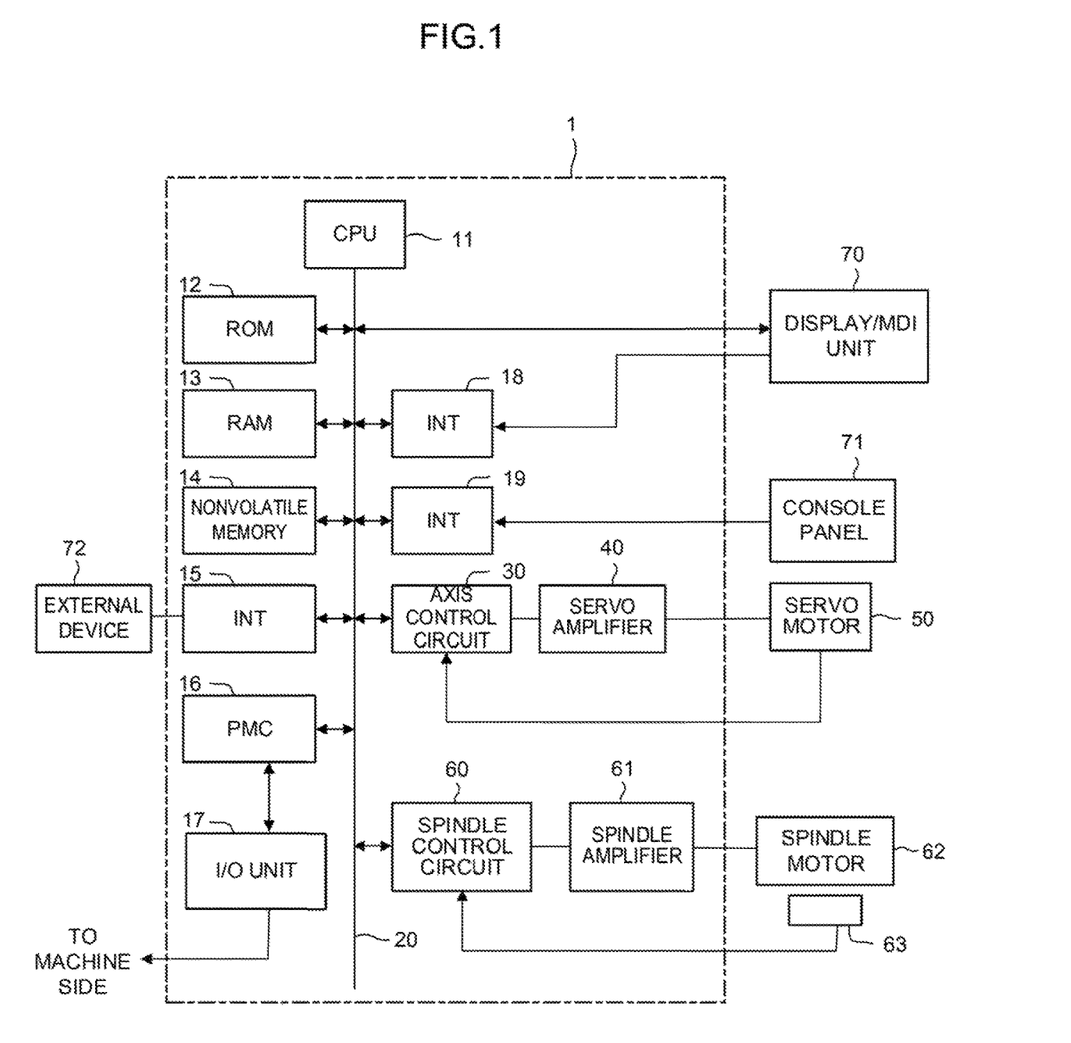
FIG. 1 is a schematic hardware configuration diagram illustrating a main part of a numerical controller according to a first embodiment.

FIG. 1 is a schematic hardware configuration diagram illustrating a main part of a machine tool including a numerical controller according to a first embodiment and a tool change device controlled by the numerical controller.

A central processing unit (CPU) 11 included in the numerical controller 1 according to the present embodiment is a processor that controls the numerical controller 1 as a whole. The CPU 11 reads a system program stored in a read only memory (ROM) 12 via a bus 20, and controls the entire numerical controller 1 according to the system program. A random access memory (RAM) 13 stores temporary calculation data or display data, various data input by an operator via a display/manual data input (MDI) unit 70 described below, etc.

A nonvolatile memory 14 is configured as a memory that is kept in a storage state even when a power supply of the numerical controller 1 is turned OFF, for example, by being backed up by a battery (not illustrated). A parameter, a machining program, tool correction data, etc. to be retained after the power source is turned OFF are stored in the nonvolatile memory 14. The nonvolatile memory 14 further stores an NC program operation processing program, etc. used to operate an NC program, and these programs are loaded in the RAM 13 at the time of execution. In addition, various system programs for executing processing of an edit mode, etc. required for creating and editing the NC program are written to the ROM 12 in advance.

An interface 15 is an interface for connecting the numerical controller 1 to an external device 72 such as an adapter. The NC program, various parameters, etc. are read from the external device 72 side. In addition, the NC program edited in the numerical controller 1 can be stored in external storage means via the external device 72.

A programmable machine controller (PMC) 16 receives an M (auxiliary) function signal, an S (spindle speed control) function signal, a T (tool selection) function signal, etc. from the CPU 11 via the bus 20, processes these signals using a sequence program, and outputs an output signal to a peripheral device of the machine tool (for example, the tool change device, etc.) via an input/output (I/O) unit 17. In addition, the PMC 16 receives signals of various switches, etc. of a console panel provided in a main body of the machine tool, performs necessary signal processing thereon, and then delivers the signals to the CPU 11.

The display/MDI unit 70 is a manual data input device including a display, a keyboard, etc., and an interface 18 receives a command or data from the keyboard of the display/MDI unit 70 and delivers the command or data to the CPU 11. An interface 19 is connected to a console panel 71 including a manual pulse generator, etc. used when each axis is manually driven.

An axis control circuit 30 for controlling an axis included in the machine tool receives a movement command of the axis from the CPU 11, and outputs a command of the axis to a servo amplifier 40. The servo amplifier 40 receives the command of the axis, and drives a servomotor 50 that moves the axis included in the machine tool. The servomotor 50 of the axis incorporates a position/speed detector, feeds a position/speed feedback signal from this position/speed detector back to the axis control circuit 30, and performs feedback control of a position/speed. In the embodiment, a magazine drive motor for driving and turning the tool magazine of the tool change device is driven by the servo amplifier 40. In the hardware configuration diagram of FIG. 1, one axis control circuit 30, one servo amplifier 40, and one servomotor 50 are illustrated. However, in practice, a plurality of axis control circuits, a plurality of servo amplifiers, and a plurality of servomotors are prepared depending on the number of axes to be controlled.

A spindle control circuit 60 receives a spindle rotation command to the machine tool and outputs a spindle speed signal to a spindle amplifier 61. In response to receiving this spindle speed signal, the spindle amplifier 61 rotates a spindle motor 62 of the machine tool at a commanded rotational speed to drive the tool. A position coder 63 is coupled to the spindle motor 62, the position coder 63 outputs a feedback pulse in synchronization with rotation of the spindle, and a feedback pulse thereof is read by the CPU 11.

Figure 2:
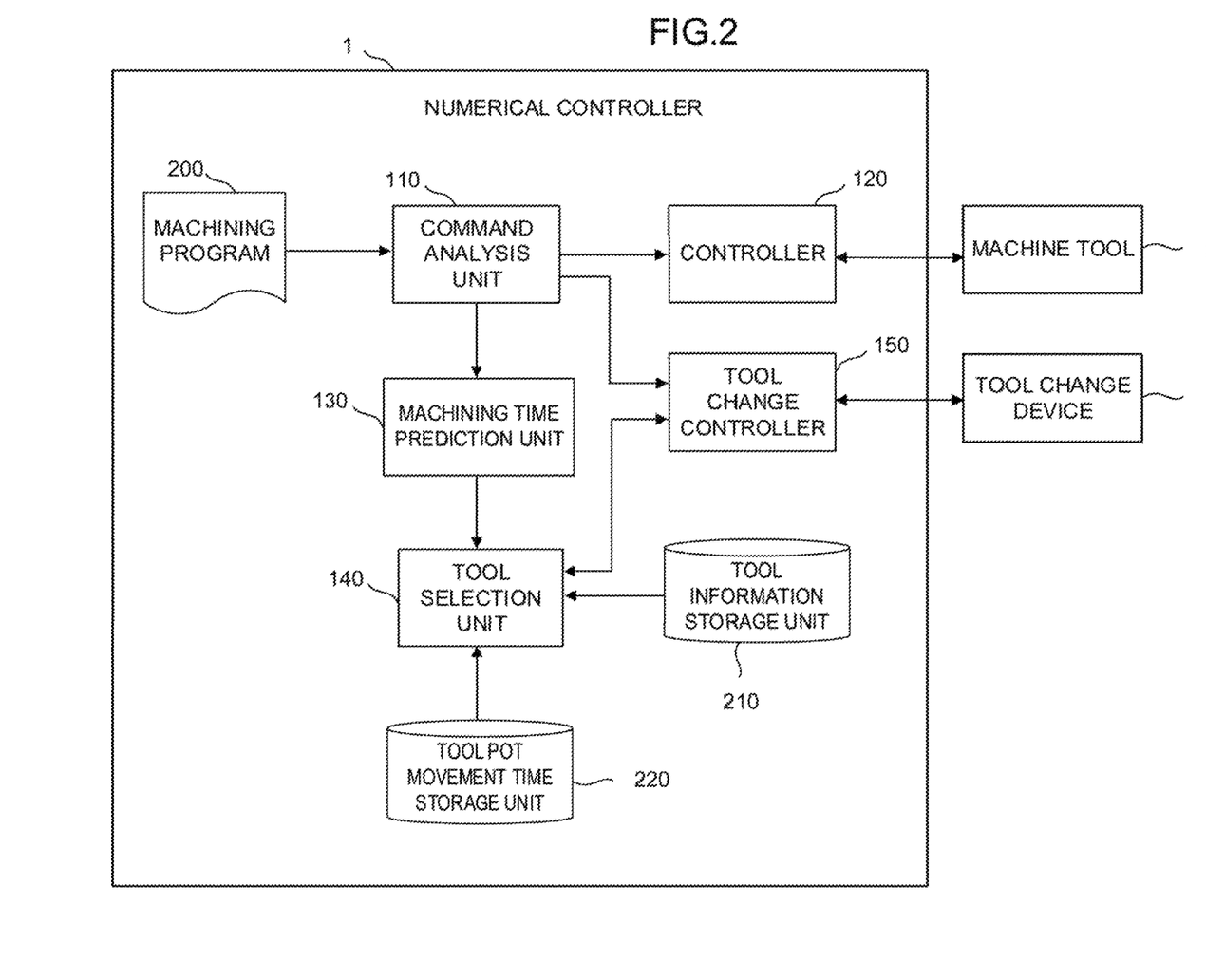
FIG. 2 is a schematic function block diagram of the numerical controller according to the first embodiment.

FIG. 2 is a schematic functional block diagram of the numerical controller according to the first embodiment when a system program for implementing a tool change function is mounted in the numerical controller 1 illustrated in FIG. 1.

Each function block illustrated in FIG. 2 is implemented when the CPU 11 included in the numerical controller 1 illustrated in FIG. 1 executes the system program of the tool change function and controls an operation of each unit of the numerical controller 1. The numerical controller 1 of the present embodiment includes a command analysis unit 110, a controller 120, a machining time prediction unit 130, a tool selection unit 140, and a tool change controller 150, and a tool information storage unit 210 that stores information about a tool held in each tool pot of the tool magazine of the tool change device 3 and a tool pot movement time storage unit 220 that stores a time required to change (move) a predetermined tool pot at a tool change position to another tool pot are provided on the nonvolatile memory 14. The time required to change the predetermined tool pot at the tool change position to another tool pot stored in the tool pot movement time storage unit 220 is previously measured by an experiment, etc.

The command analysis unit 110 successively reads an analyzes blocks of a machining program 200 to be executed that is stored in the nonvolatile memory 14, and outputs a control command created based on an analysis result thereof to the controller 120. In addition, when a block read from the machining program 200 corresponds to a tool selection command that commands tool selection, the command analysis unit 110 prefetches, from the machining program 200, a block between the tool selection command and a tool change command executed after the tool selection command, and outputs the prefetched block to the machining time prediction unit 130. Further, when tool selection is commanded by a block of the machining program 200, the command analysis unit 110 commands the tool change controller 150 to change the tool.

The controller 120 controls each axis of the machine tool 2 or an operation of the spindle, etc. based on a control command received from the command analysis unit 110.

The machining time prediction unit 130 analyzes the block between the tool selection command and the tool change command received from the command analysis unit 110, and predicts a machining time corresponding to a machining time required for machining by these blocks. For example, after taking into consideration a machine configuration (parameter setting of a time constant, etc. or a time required for M, S, T, and B auxiliary functions), etc. of the machine tool 2, the machining time prediction unit 130 predicts a movement time of each axis according to each command or an operation time of a peripheral device using a machining time prediction method according to conventional technologies (Japanese Patent Application Laid-Open No. 2012-093975, Japanese Patent Application Laid-Open No. 2005-301440, and Japanese Patent Application Laid-Open No. 2007-025945, and accumulates a predicted machining time by each command, thereby predicting the machining time. A method of predicting a machining time is well known, and thus a detailed description thereof will be omitted here.

The tool selection unit 140 selects a tool designated by the tool selection command based on the machining time required for machining by the block between the tool selection command and the tool change command predicted by the machining time prediction unit 130, and commands the tool change controller 150 to move a tool pot holding the selected tool to the tool change position. The tool selection unit 140 selects, from tools designated by the tool selection command, a tool that can be selected within a time shorter than the machining time predicted by the machining time prediction unit 130. In particular, if there are a plurality of tools that can be selected within a time shorter than the machining time predicted by the machining time prediction unit 130, then the tool selection unit 140 selects a tool according to the order of priority (for example, descending order of remaining lives of tools, etc.) determined in advance.

Figure 3:
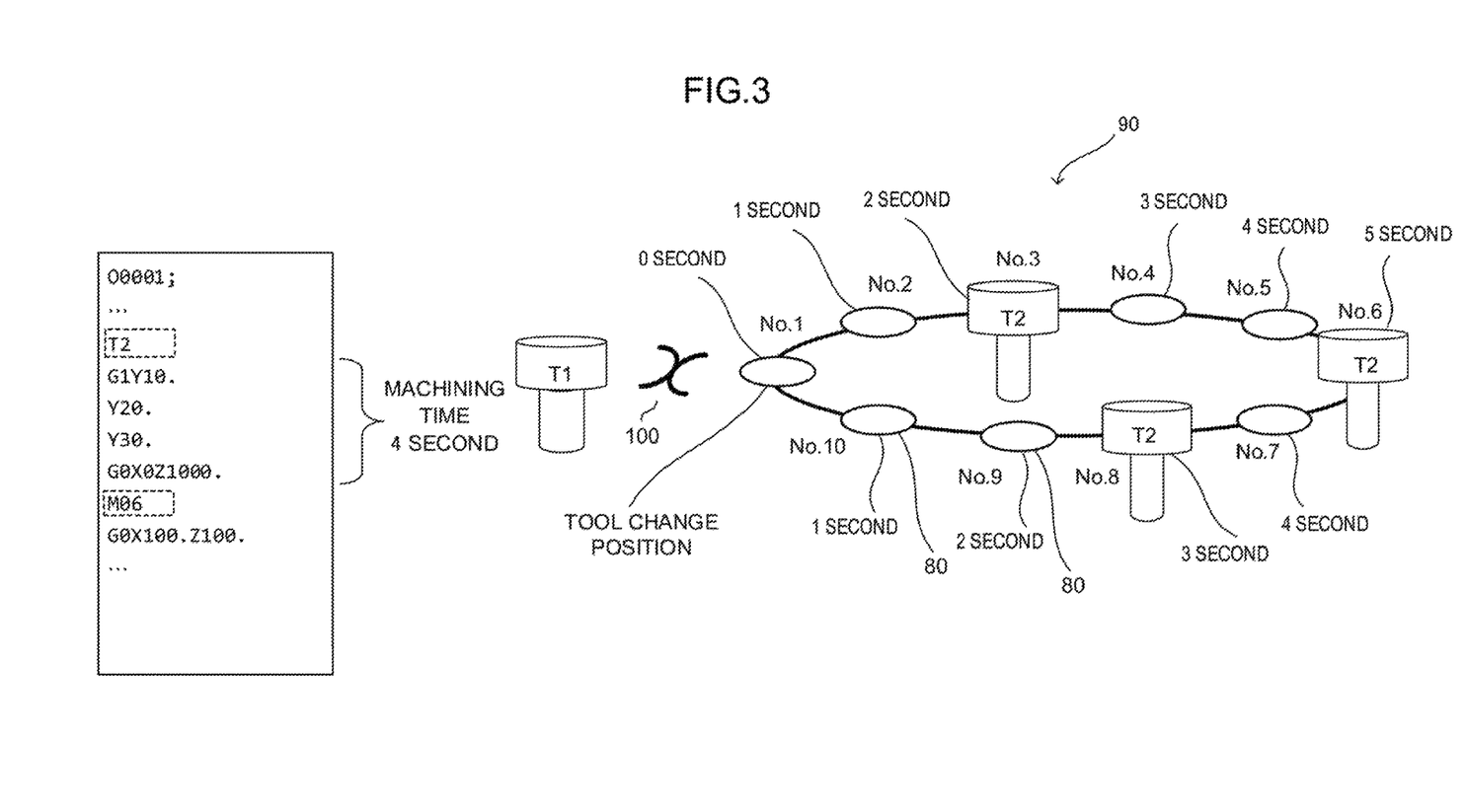
FIG. 3 is a diagram for description of a tool selection method by a tool selection unit of the first embodiment.

FIG. 3 is a diagram for description of a tool selection method by the tool selection unit 140 of the present embodiment. In FIG. 3, for simplicity of description, it is presumed that it takes one second to move an adjacent tool pot.

The tool selection unit 140 specifies a tool pot 80 in which a tool to be selected, designated by the tool selection command is held, by retrieving information about a tool held by each tool pot 80 of a tool magazine 90 stored in the tool information storage unit 210, and specifies a current position of the tool magazine 90 (that is, a current position of each tool pot 80) from the tool change controller 150. Further, the tool selection unit 140 specifies a time required to move each tool to be selected, designated by the tool selection command, to the tool change position by referring to a time required to move the tool pot 80 stored in the tool pot movement time storage unit 220 from each position to the tool change position. Then, the tool selection unit 140 selects a tool according to the order of priority determined in advance, from tools to be selected satisfying "predicted machining time predicted by machining time prediction unit >tool selection time".

For example, in an example illustrated in FIG. 3, T2 corresponding to a tool to be selected is held in three tool pots 80 (No. 3, No. 6, and No. 8) of the tool magazine 90. However, it takes five seconds (>predicted machining time of four seconds) to select the tool T2 held in the tool pot 80 of No. 6, and thus the tool T2 is not selected. The tools T2 held in the tool pots 80 of No. 3 and No. 8 can move to the tool change position within a time shorter than the predicted machining time of four seconds predicted by the machining time prediction unit 130. Thus, the tool selection unit 140 selects a tool according to a predetermined order of priority from the tools T2 held in the tool pots 80 of No. 3 and No. 8.

In response to a command commanding to perform tool change by the command analysis unit 110, the tool change controller 150 controls the tool change device 3 to perform tool change such that the tool mounted on the spindle is removed and a tool which has been indexed at the tool change position is mounted on the spindle. In addition, the tool change controller 150 controls the tool change device 3 to move the tool pot 80 holding the tool to be selected to the tool change position based on a command from the tool selection unit 140.

As a modification of the numerical controller 1 of the present embodiment, the command analysis unit 110 not only prefetches a block between a first tool selection command and a first tool change command subsequent to the first tool selection command, at the time of reading a block of the first tool selection command, but also prefetches a block between a previous second tool selection command and a second tool change command subsequent to the second tool selection command. Further, the machining time prediction unit 130 predicts each of a first predicted machining time between the first tool selection command and the first tool change command and a second predicted machining time between the second tool selection command and the second tool change command. Furthermore, when a plurality of tools to be selected that are designated by the first tool selection command are present in the tool magazine 90, the tool selection unit 140 selects a tool to be selected that is designated by the first tool selection command, taking into consideration a time required for selection of a tool by the first tool selection command, a time required for selection of a tool by the second tool selection command, the first predicted machining time, and the second predicted machining time.

Figure 4:
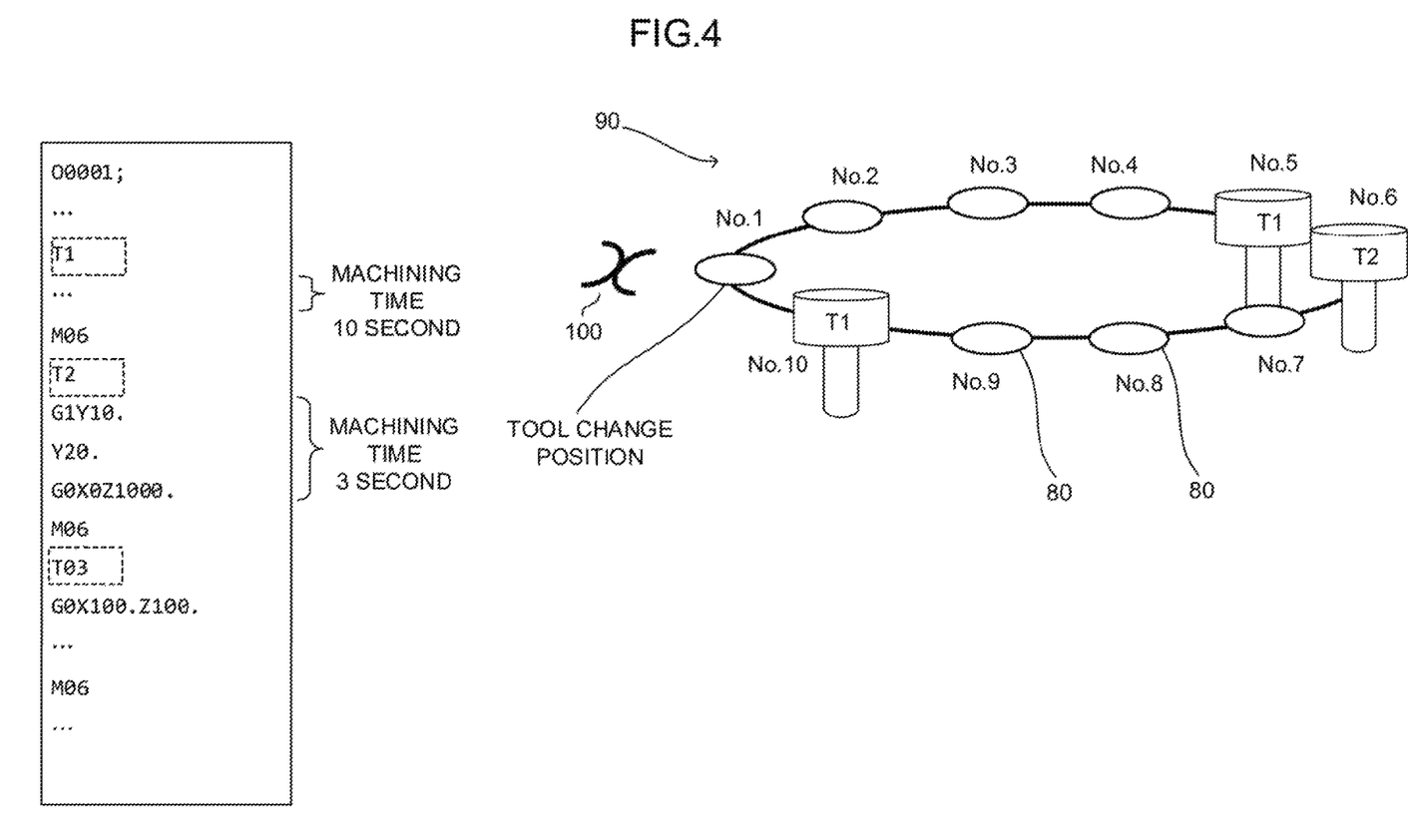
FIG. 4 is a diagram for description of a tool selection method by a tool selection unit of a modification of the first embodiment.

FIG. 4 is a diagram for description of a tool selection method by the tool selection unit 140 of the present modification.

In a machining program illustrated in FIG. 4, after a tool T1 is designated by a tool selection command, tool change is commanded after a machining time of 10 seconds. Thereafter, after a tool T2 is designated by a tool selection command, tool change is commanded after a machining time of three seconds. In addition, the tool T1 is held in tool pots 80 of No. 5 and No. 10, and the tool T2 is held in a tool pot 80 of No. 6. Further, in an example of FIG. 4, for simplicity of description, it is presumed that it takes one second, similarly to the example illustrated in FIG. 3, to move an adjacent tool pot 80 to a tool change position. In such a case, when the tool T1 is designated by the tool selection command, the tool selection unit 140 of the present modification selects a tool from the tool T1 of No. 5 and the tool T1 of No. 10 which can be selected during a predicted machining time of 10 seconds. However, in this instance, a case in which the tool T2 is selected by the subsequent tool selection command is considered. More specifically, when the tool T1 held in the tool pot 80 of No. 5 is selected by a tool selection command designating the tool T1, the tool pot 80 of No. 5 is indexed at the tool change position after tool change. Thereafter, when the tool selection command designating the tool T2 is executed, it takes one second to move the tool pot 80 of No. 6 holding the tool T2 to the tool change position, which is shorter than a predicted machining time of three seconds from the tool selection command designating the tool T2 to a subsequent tool change command. Thus, change to the tool T2 can be performed without occurrence of a waiting time. However, when the tool T1 held in the tool pot 80 of No. 10 is selected by the tool selection command designating the tool T1, the tool pot 80 of No. 10 is indexed at the tool change position after tool change. Thereafter, when the tool selection command designating the tool T2 is executed, it takes four seconds to move the tool pot 80 of No. 6 holding the tool T2 to the tool change position, which is longer than the predicted machining time of three seconds from the tool selection command designating the tool T2 to the subsequent tool change command. Thus, subsequent machining is kept waiting until tool selection and change are completed. For this reason, in the example of FIG. 4, when the tool selection command designating the tool T1 is executed, the tool selection unit 140 operates to select the tool T1 held in the tool pot 80 of No. 5. In the example of FIG. 4, an example of performing a tool selection operation considering the first and second predicted machining times is illustrated. However, it is possible to perform a tool selection operation taking further into consideration a time required for previous tool selection and a predicted machining time.

According to the modification described above, the numerical controller 1 is configured to perform tool selection taking into consideration a time required for tool selection by a future tool selection command and a predicted machining time, in addition to a time required for tool selection by a most recent tool selection command and a predicted machining time, and thus it is possible to perform efficient tool change based on the entire machining program.

Figure 5:
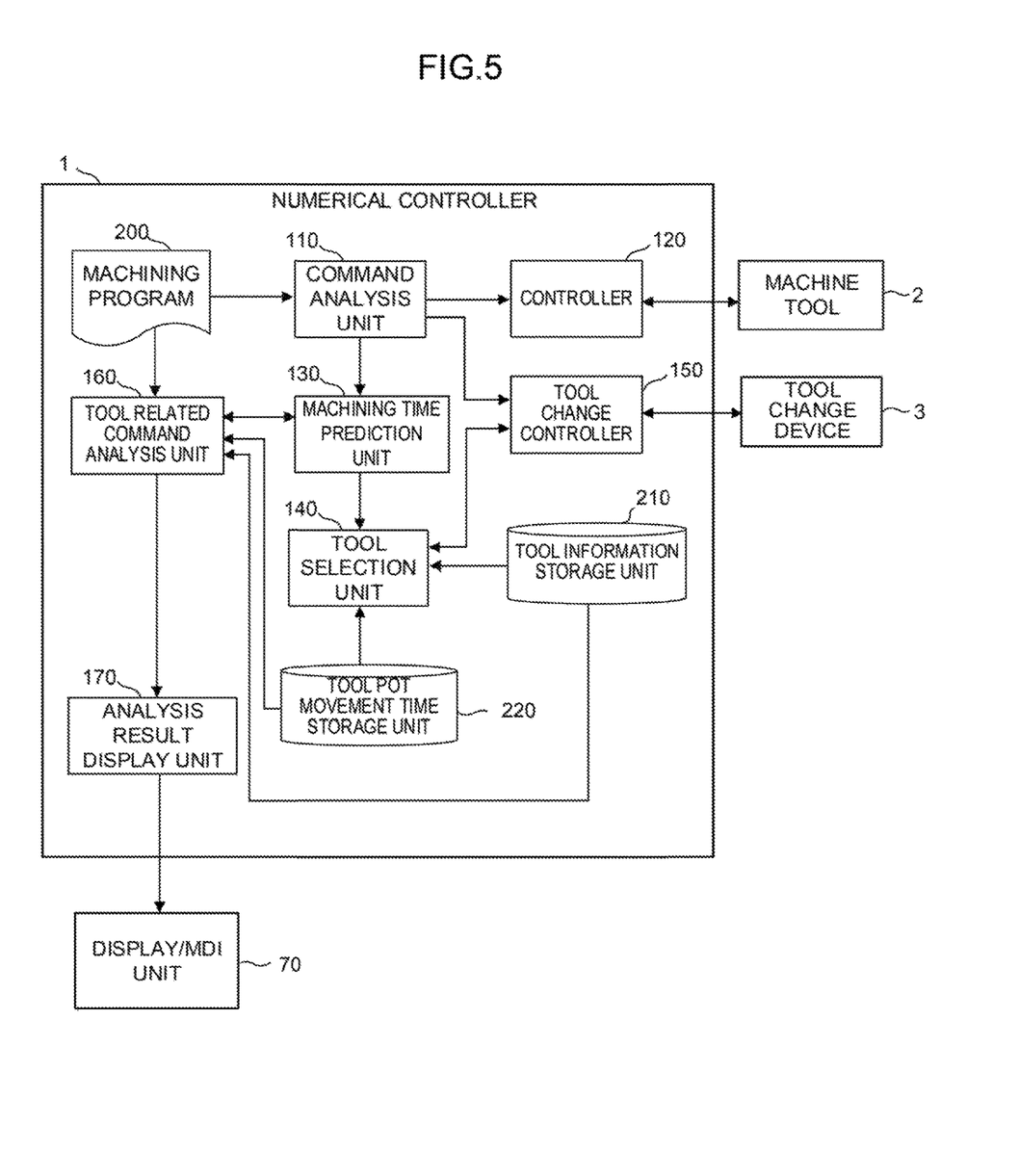
FIG. 5 is a schematic function block diagram of a numerical controller according to a second embodiment.

FIG. 5 is a schematic function block diagram of a numerical controller according to a second embodiment when a system program for implementing a tool change function is mounted on the hardware of the numerical controller 1 illustrated in FIG. 1. Similarly to the numerical controller 1 of the first embodiment, each function block illustrated in FIG. 5 is implemented when the CPU 11 included in the numerical controller 1 illustrated in FIG. 1 executes the system program of the tool change function and controls an operation of each unit of the numerical controller 1. The numerical controller 1 of the present embodiment further includes a tool related command analysis unit 160 and an analysis result display unit 170, in addition to each function block described in the first embodiment.

The tool related command analysis unit 160 reads each block of a machining program 200 from a memory before machining by the machining program 200 starts, and determines whether a waiting time for waiting for tool selection by a tool selection command occurs at the time of execution of a tool change command with respect to the tool selection command and the tool change command commanded in the machining program 200. The tool related command analysis unit 160 analyzes a time required for selection of each tool in the machining program 200 based on information about a tool held in each tool pot 80 of a tool magazine 90 stored in a tool information storage unit 210 and a time required to change (move) a predetermined tool pot 80 present at a tool change position stored in a tool pot movement time storage unit 220 to another tool pot 80.

Figure 6:
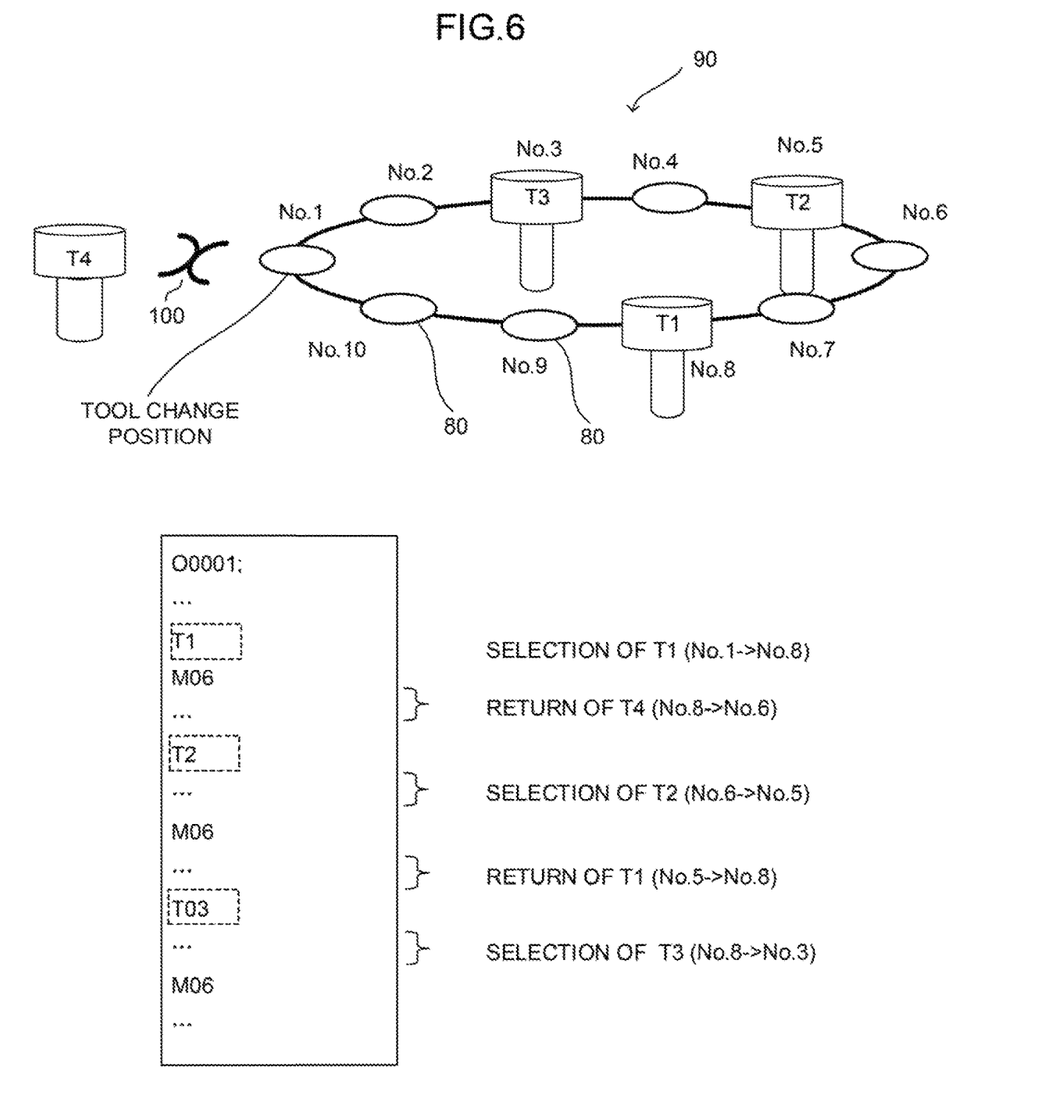
FIG. 6 is a diagram for description of analysis processing of a machining program by a tool related command analysis unit.

FIG. 6 is a diagram for description of analysis processing of the machining program 200 by the tool related command analysis unit 160.

FIG. 6 illustrates an example in which a tool is managed using a so-called fixed address method (a scheme of returning a used tool to an original tool pot) by a tool change device 3. In addition, in FIG. 6, at the time of starting machining, a tool T4 (held in a tool pot 80 of No. 6 in the tool magazine 90) is mounted on a spindle, a tool T1 is held in a tool pot 80 of No. 8, a tool T2 is held in a tool pot 80 of No. 5, and a tool T3 is held in a tool pot 80 of No. 3. In addition, in FIG. 6, for simplicity of description, it is presumed that it takes one second to move an adjacent tool pot 80. In this case, the tool related command analysis unit 160 specifies a time (tool selection time) required for movement of the tool pot 80 during the time from the tool selection command to the tool change command during execution of the machining program 200 and a time (tool return time) required for movement of the tool pot 80 during the time from the tool change command to the tool selection command. In the machining program illustrated in FIG. 6, the tool T4 is returned to the tool pot 80 of No. 6 during a period from the tool change command to the tool T1 to the tool selection command for designating the tool T2. However, since change to the tool T1 is performed immediately before, the tool pot 80 at the tool change position corresponds to No. 8. Thus, the tool pot 80 at the tool change position needs to be moved from No. 8 to No. 6 during this period, a time required therefor is 2 seconds. In addition, during a period from the tool selection command for designating the tool T2 to a subsequent tool change command (tool change command to the tool T2), the tool T2 needs to be moved to the tool change position, and thus the tool pot 80 at the tool change position needs to be moved from the tool pot of No. 6 to the tool pot 80 of No. 5. A time required therefor is one second. In this way, the tool related command analysis unit 160 specifies a time required for changing of the tool pot 80 at the tool change position between the tool selection command and the tool change command. Meanwhile, the tool related command analysis unit 160 commands the machining time prediction unit 130 to predict a machining time required for machining by a block between the tool selection command and the tool change command. Then, the time required for changing of the tool pot 80 at the tool change position between the tool selection command and the tool change command specified in this way is compared with the predicted machining time required for machining by the block between the tool selection command and the tool change command predicted by the machining time prediction unit 130, thereby determining whether a waiting time for waiting for tool selection by the tool selection command occurs at the time of execution of the tool change command.

Figure 7:
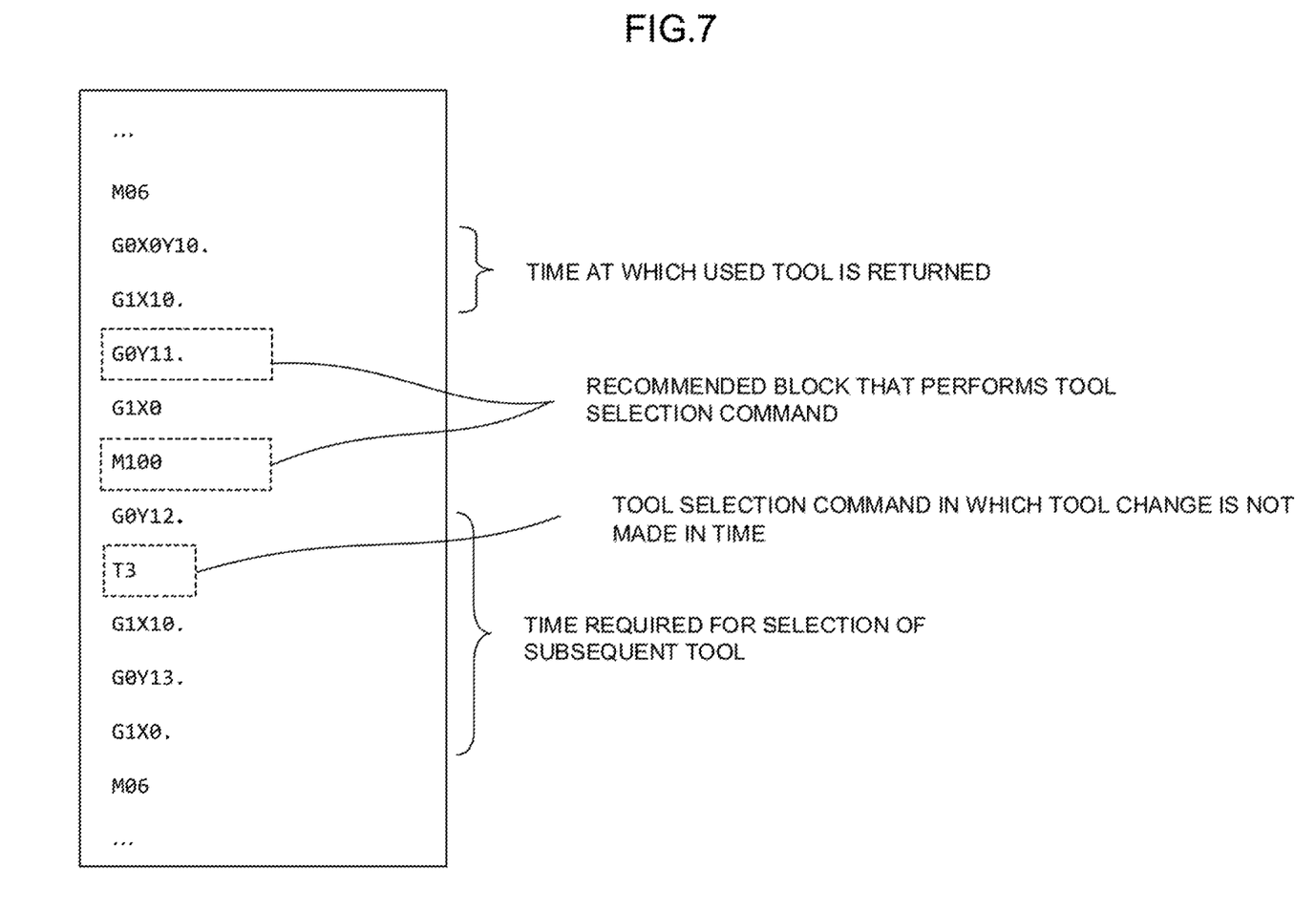
FIG. 7 is a diagram for description of a process of specifying a block to which a tool selection command is moved.

In a case in which it is determined that the waiting time for waiting for tool selection designated by the tool selection command occurs at the time of execution of the tool change command, the tool related command analysis unit 160 specifies a block that eliminates the waiting time for waiting for tool selection designated by the tool selection command when the tool selection command is moved to a position of the block based on prediction of machining time of a command of each block before the tool change command previous to the tool change command predicted by the machining time prediction unit 130. It is desirable that the block (recommended block) to which the tool selection command specified here is to be moved is a non-cutting block. For example, in a machining program illustrated in FIG. 7, when selection of a tool by a tool selection command T3 is not made in time until a subsequent tool change command, "G0Y11." and "M100" which are non-cutting blocks executed before a time required for selection of a subsequent tool (T3) and after a time required for returning a used tool from previous tool change are specified as blocks to which the tool selection command T3 is moved.

In addition, in a case in which it is determined that the waiting time for waiting for tool selection designated by the tool selection command occurs at the time of execution of the tool change command, and in a case in which there is no destination of the tool selection command at which the waiting time at the time of execution of the tool change command disappears (for example, in a case in FIG. 7 in which a time during which a used tool is returned after previous tool change overlaps a time required for selection of a subsequent tool), the tool related command analysis unit 160 analyzes a tool and a tool pot 80 of the tool magazine 90 of the tool change device 3 that eliminate the waiting time for waiting for tool selection designated by the tool selection command at the time of execution of the tool change command when the tool is held in the tool pot 80. For example, the tool related command analysis unit 160 may simply obtain a tool pot 80 that eliminates occurrence of the waiting time when a tool causing the waiting time is moved from a current tool pot 80 to the tool pot 80, or may create a combination of a tool and a tool pot to calculate a waiting time at the time of execution of the tool change command in each case, thereby obtaining a combination that eliminates occurrence of the waiting time at the time of execution of the tool change command.

When the tool related command analysis unit 160 determines that the waiting time for waiting for tool selection by the tool selection command occurs at the time of execution of the tool change command, the analysis result display unit 170 displays the tool selection command on a display/MDI unit 70. Alternatively, when the tool related command analysis unit 160 determines that the waiting time for waiting for tool selection by the tool selection command occurs at the time of execution of the tool change command, the analysis result display unit 170 may display a recommended block that moves the tool selection command causing the waiting time on the display/MDI unit 70. Alternatively, when the tool related command analysis unit 160 determines that the waiting time for waiting for tool selection by the tool selection command occurs at the time of execution of the tool change command, the analysis result display unit 170 may display a previous tool pot 80 to which a tool causing the waiting time is moved or display an optimum combination of a tool and a tool pot 80.

The embodiments have been described above. However, the embodiments are not limited only to the examples of the above-described embodiments, and can be implemented in various modes by making appropriate changes.

The invention claimed is:

1. A numerical controller for performing control for changing a first tool mounted on a spindle to a second tool stored in a tool magazine based on a machining program, the numerical controller comprising:
   a processor configured to:
   analyze a command of a block of the machining program;
   when the analyzed command of the block is a tool selection command, prefetch, from the machining program, a block between the tool selection command and a tool change command executed after the tool selection command;
   predict a time required for machining the prefetched block; and
   select a tool which can be changed before the tool change command during tool selection, as a second tool, based on the predicted time required for machining.

2. The numerical controller according to claim 1, wherein the processor is further configured to:
   store in advance a time required to move a tool pot at a tool change position of the tool magazine to a predetermined tool pot,
   wherein when the tool selection command is issued during a machining operation by the machining program, the processor selects a tool allowed to be selected within a machining time from the tool selection command to a subsequent tool change command, wherein the machining corresponds to the predicted time required for machining by the prefetched block, by referring to the stored time required to move the tool pot.

3. The numerical controller according to claim 2, wherein when a plurality of tools is allowed to be selected within the machining time from the tool selection command to the tool change command, the processor selects a tool to be changed according to a predetermined order of priority determined in advance.

4. The numerical controller according to claim 1, wherein the processor performs tool selection by the tool selection command such that tool selection by another tool selection command commanded after the tool selection command is allowed before a tool change command subsequent to the another tool selection command.

5. The numerical controller according to claim 1, wherein the processor is further configured to
   determine whether tool selection by the tool selection command by the block of the machining program ends before execution of a tool change command subsequent to the tool selection command at a start of a program operation.

* * * * *